United States Patent
Ziesse

[19]

[11] Patent Number: 6,026,132

[45] Date of Patent: Feb. 15, 2000

[54] METHOD AND APPARATUS FOR MITIGATING THE EFFECTS OF RAYLEIGH FADING AT LOW VEHICLE SPEEDS

[75] Inventor: Norman Gerard Ziesse, Chester, N.J.

[73] Assignee: Lucent Technologies, Inc., Murray Hill, N.J.

[21] Appl. No.: 08/939,452

[22] Filed: Sep. 29, 1997

[51] Int. Cl.[7] .................................................. H04B 7/10
[52] U.S. Cl. .................... 375/347; 375/299; 455/52.3; 455/101; 455/562
[58] Field of Search .................... 375/295, 296, 375/299, 346, 347, 348, 349; 455/32.1, 52.3, 54.1, 65, 101, 272, 561, 562

[56] References Cited

U.S. PATENT DOCUMENTS

| | | | |
|---|---|---|---|
| 5,305,353 | 4/1994 | Weerackody | 375/347 |
| 5,457,712 | 10/1995 | Weerackody | 375/347 |
| 5,715,516 | 2/1998 | Howard et al. | 455/33.1 |
| 5,745,858 | 4/1998 | Sato et al. | 455/562 |
| 5,781,845 | 7/1998 | Dybdal et al. | 455/65 |
| 5,842,118 | 11/1998 | Wood | 455/101 |
| 5,848,103 | 12/1998 | Weerackody | 375/295 |

*Primary Examiner*—Stephen Chin
*Assistant Examiner*—Chieh M. Fan

[57] ABSTRACT

A wireless transmitter is disclosed that mitigates the 3 MPH effect, which is the phenomenon of poor received signal quality at a wireless receiver because neither transmit power control nor data interleaving are capable of overcoming the effects of Rayleigh fading. Some of the wireless transmitters disclosed mitigate the 3 MPH effect by having the transmit antenna move mechanically, as on a turntable. Other transmitters achieve the same effect by moving the phase center of the transmitted signal between two or more stationary antennas. The phase center of the transmitted signal can be made to move between stationary antennas by electronically manipulating and varying the amount of signal radiated by each antenna. In an illustrative embodiment of the present invention, a signal to be transmitted is switched back and forth between two stationary antennas at a rate that creates virtual motion as observed by the wireless terminal sufficient to remove the wireless terminal from the depths of the 3 MPH effect.

18 Claims, 3 Drawing Sheets

METHOD AND APPARATUS FOR MITIGATING THE EFFECTS OF RAYLEIGH FADING AT LOW VEHICLE SPEEDS

FIELD OF THE INVENTION

The present invention relates to wireless telecommunications in general, and, more particularly, to a method and apparatus for mitigating the effects of Rayleigh fading at low vehicle speeds.

BACKGROUND OF THE INVENTION

FIG. 1 depicts wireless terminal 101 and base station 103, which is part of a digital wireless telecommunications system in the prior art. Although base station 103 is stationary, wireless terminal 101 is not, and, therefore, the distance between wireless terminal 101 and base station 103 varies as wireless terminal 101 moves. As the distance between wireless terminal 101 and base station 103 varies, the strength of the signal received by wireless terminal 101 fluctuates as a result of the well-known phenomenon of Rayleigh fading, even though the strength of the signal transmitted by base station 103 is constant.

Base station 103 incorporates two mechanisms for mitigating the effects of Rayleigh fading. The first mechanism is transmit power control, which increases the transmit power when wireless terminal 101 is in a fade and decreases the transmit power when wireless terminal 101 is in the clear. Because the transmit power control reacts to how a previously transmitted signal was received, there is inherently a delay between current circumstances and the remedy for those circumstances.

When wireless terminal 101 moves slowly, and, therefore, enters and exits Rayleigh fades slowly, the transmit power control is typically capable of responding adequately such that the quality of the received signal is maintained. In contrast, as wireless terminal 101 moves more quickly, the transmit power control is less capable of responding adequately and, therefore, the quality of the received signal degrades. FIG. 2 depicts a graph of the quality of the received signal strength due to Rayleigh fading and transmit power control as a function of the speed with which wireless terminal 101 moves with respect to base station 103.

The second mechanism that wireless terminal 101 and base station 103 use for mitigating the effects of Rayleigh fading is data interleaving. As is well-known in the prior art, data interleaving is a technique for the error correction and detection of burst-errors. Data interleaving is efficacious when only a modest portion of the interleaved block is affected by a fade and is generally ineffective when most of the interleaved block is affected by a fade. Therefore, data interleaving is most effective for mitigating the effects of Rayleigh fading when wireless terminal 101 is moving quickly, and is, therefore, entering and exiting Rayleigh fades so quickly that it is unlikely that wireless terminal 101 is in a fade during the transmission of a single interleaved block. In contrast, data interleaving is less effective, or even entirely ineffective when wireless terminal 101 is moving slowly and can be in a deep fade during the entire transmission of a single interleaved block. FIG. 3. depicts a graph of the quality of the received signal strength due to Rayleigh fading and data interleaving as function of the speed with which wireless terminal 101 moves with respect to base station 103.

As can be seen in FIGS. 2 and 3, transmit power control mitigates Rayleigh fading at low speeds and data interleaving mitigates Rayleigh fading at high speeds. For some wireless telecommunications systems, either transmit power control or data interleaving is capable of sufficiently mitigating Rayleigh fading at all speeds. For other systems, however, there exists a gap when neither transmit power control nor data interleaving is capable of sufficiently mitigating Rayleigh fading.

FIG. 4 depicts a graph of the quality of the received signal strength due to Rayleigh fading as mitigated by both transmit power control and data interleaving, as function of the speed with which wireless terminal 101 moves with respect to base station 103. The salient characteristic in the graph of FIG. 4 is the severe dip in signal quality that exists at a narrow range of speeds because neither transmit power control nor data interleaving is capable of sufficiently overcoming the effect of Rayleigh fading. Although the speed at which the dip occurs depends on the specifics of the given system, for IS-95 CDMA systems the dip is most prominent at about 3 MPH. For this reason, the phenomenon is colloquially called the "3 MPH Effect."

It is particularly unfortunate that the dip occurs at 3 MPH for IS-95 CDMA wireless telecommunications systems because that is close to the typical speed (in the direction of the base station) at which cars travel in traffic jams, and people in traffic jams are wont to place wireless calls.

Therefore, the need exists for a technique that mitigates the 3 MPH effect. Clearly, however, the 3 MPH effect can be eliminated in either of three ways. First, the rapidity with which the transmit power control operates can be increased, or, second, the length of the data interleaving block can be increased so that it becomes improbable that wireless terminal 101 could remain in a fade during the transmission of a substantial portion of an interleaved block. Both the transmit power control and the length of the data interleaving block are typically specified by the air interface, which is the specification that the manufacturers of both wireless terminals and wireless infrastructure equipment must design to. Therefore, changing either the transmit power control or the length of the data interleaving block require that the air-interface standard be changed, and, therefore, that billions of dollars worth of wireless telecommunications infrastructure and terminal equipment be upgraded at a potential cost of tens or hundreds of millions of dollars.

The third apparent remedy to the 3 MPH effect is simply to greatly and permanently increase the transmit power of the radiated signal. That remedy, however, has so many interference and health drawbacks associated with it that the remedy is more dangerous than the problem. When the transmit power of the radiated signal is increased, the likelihood increases that the radiated signal will interfere with other signals. Furthermore, an increase in radiated signal strength increases the likelihood that humans will be exposed to dangerous levels of radiation.

Therefore, the need exists for a technique that eliminate the 3 MPH effect without requiring a change to the air interface and without changing the transmit power of the radiated signal.

SUMMARY OF THE INVENTION

Some embodiments of the present invention are capable of mitigating the "3 MPH effect" without requiring a change to the air interface between the base station and the wireless terminal and without changing the transmit power of the radiated signal. Embodiments of the present invention are premised on the observation that a wireless terminal in the throes of the 3 MPH effect could have its received signal quality improved if the base station, could, somehow, make the wireless terminal move faster. Although this is probably not practical, it does lead to the realization that the same goal could be obtained if the antenna at the base station moved.

The antenna at the base station could move mechanically through various means or the same effect can be achieved by moving the phase center of the transmitted signal between two or more stationary antennas. The phase center of the transmitted signal, which is the apparent origin of the signal, can be made to move between stationary antennas by electronically manipulating and varying the amount of signal radiated by each antenna. In an illustrative embodiment of the present invention, a signal to be transmitted is switched back and forth between two stationary antennas at the base station at a rate that creates virtual motion at the wireless terminal sufficient to remove the wireless terminal from the depths of the 3 MPH effect Although there is no minimum distance between the two antennas, in some embodiments of the present invention, the two antennas are at least $\lambda$ apart where $\lambda$ is the wavelength of a carrier signal in the signal to be transmitted and the frequency with which the signal is switched back and forth between the two antennas is in the neighborhood of 100 Hz. The frequency of 100 Hz creates virtual motion at the wireless terminal of approximately 20 to 30 MPH.

DETAILED DESCRIPTION

Embodiments of the present invention are premised on the observation that a wireless terminal in the throes of the 3 MPH effect could have its received signal quality improved if the base station could, somehow, make the wireless terminal move faster or slower. Although this is probably not practical, it does lead to the realization that the same goal could be achieved if the antenna at the base station moved, because it is not the speed of the wireless terminal with respect to ground that causes the problem, but the speed of the wireless terminal with respect to the base station's antenna.

Regardless of whether the wireless terminal or the antenna at the base station moves, the effect is the same: the rate at which the wireless terminal enters and exits Rayleigh fades changes and the wireless terminal recovers from the 3 MPH effect.

Moving the base station's antenna could be accomplished by placing the antenna on a truck and driving down the highway. This, of course, has the disadvantage that the cable between the antenna and the base station would have to be pretty long, and also that eventually the distance between the wireless terminal and the antenna would become so great that the received signal strength would eventually become unsatisfactory. The motion does not, however, need to be linear and invariant.

Figure 1:
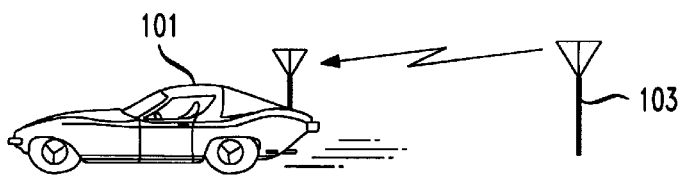
FIG. 1 depicts an illustration of a wireless terminal and associated base station in the prior art.
Figure 2:
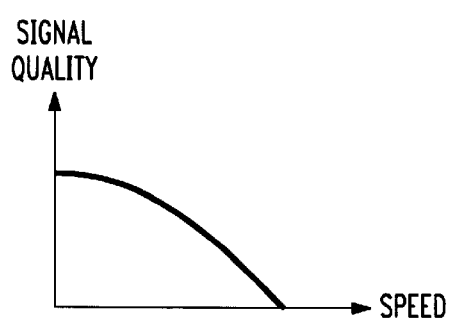
FIG. 2 depicts a graph of the received signal quality at the wireless terminal in FIG. 1 as affected by Rayleigh fading and mitigated by transmit power control, as a function of the speed of the wireless terminal.
Figure 3:
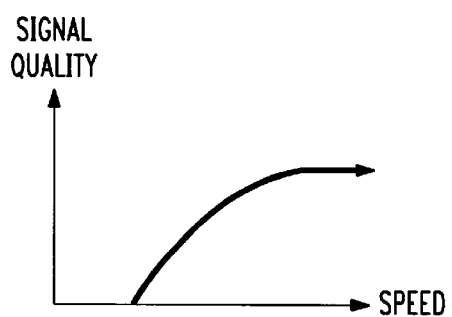
FIG. 3 depicts a graph of the received signal quality at the wireless terminal in FIG. 1 as affected by Rayleigh fading and mitigated by data interleaving, as a function of the speed of the wireless terminal.
Figure 4:
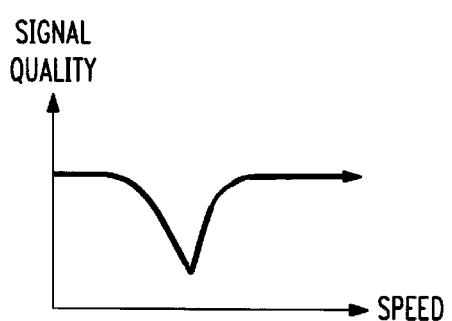
FIG. 4 depicts a graph of the received signal quality at the wireless terminal in FIG. 1 as affected by Rayleigh fading and mitigated by both transmit power control and data interleaving, as a function of the speed of the wireless terminal.
Figure 5:
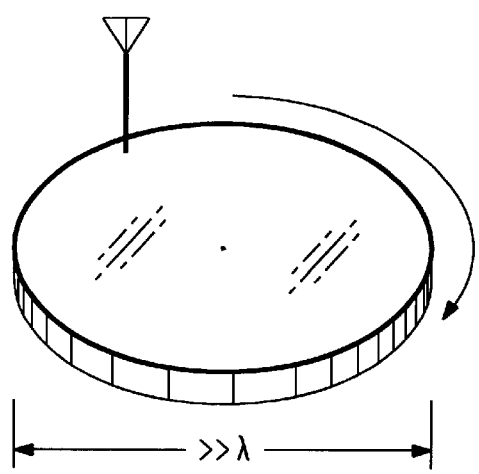
FIG. 5 depicts an illustration of an antenna that is mounted off-center on a rotating turntable.
Figure 6:
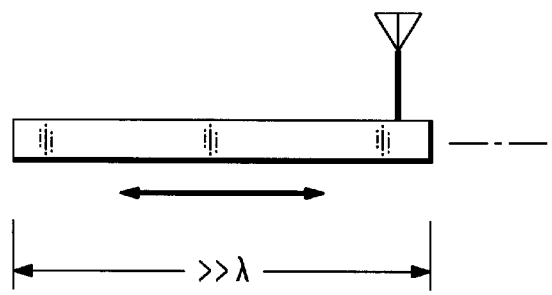
FIG. 6 depicts an illustration of an antenna that is mounted on a reciprocating member.

Alternatively, the base station's antenna could be mounted off-center on a rotating turntable, as shown in FIG. 5, or on a reciprocating member, as shown in FIG. 6. Although there is no minimum displacement of the antenna per cycle, advantageously the displacement of the antenna per cycle is at least $\lambda$, where $\lambda$ is the wavelength of the carrier of the signal of interest transmitted by the antenna. This is based on the empirical observation that the width of a typical Rayleigh fade is about $\lambda$. Therefore, when the displacement of the antenna per cycle is at least $\lambda$, the antenna radiation pattern is "jiggled" at the wireless terminal a sufficient distance to virtually guarentee that the wireless terminal exits the depths of a Rayleigh fade, regardless of the velocity of the wireless terminal with respect to ground.

If the antenna radiation pattern were jiggled too slowly, there exists the possibility that the virtual motion created at the wireless terminal might not be sufficient to overcome the 3 MPH effect. Therefore, the antenna should move, or the antenna should appear to move, or the phase center of the antenna radiation pattern should move be displaced enough times per second to sufficiently overcome the 3 MPH effect.

Advantageously, a rate of 100 Hz creates a virtual change in speed as observed by the wireless terminal of about 20 to 30 MPH. Therefore, regardless of the actual direction of travel of the wireless terminal with respect to the base station's antenna, the displacement of the base station's antenna at 100 Hz would create a virtual speed of the wireless terminal of from 17 to 33 MPH, which is well out of the severe portion of the 3 MPH effect for CDMA systems. It will be clear to those skilled in the art how to determine the displacement rate that is advantageous for a particular wireless telecommunications system.

Creating a mechanical system that displaces the base station's antenna at least $\lambda$ 100 times per second for a reasonable carrier is problematic at best. Therefore, it would be advantageous if the base station's antenna could be made to appear to move, electronically, rather than move kinetically through mechanical means.

Figure 7:
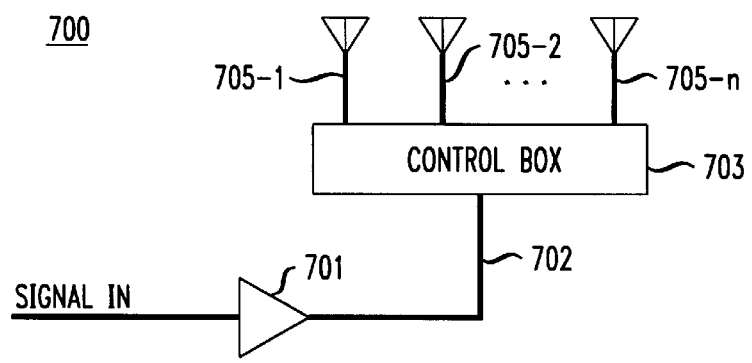
FIG. 7 depicts a block diagram of an illustrative embodiment of the present invention.

FIG. 7 depicts a block diagram of transmitter 700, which comprises: amplifier 701, switch 703, and n antennas 705-1 through 705-n, where $n \geq 2$. Transmitter 700 and its analogues are advantageous over the illustrative embodiments of the present invention depicted in FIG. 5 or FIG. 6 because transmitter 700 does not require mechanically moving components. Amplifier 701 is advantageously an amplifier that amplifies the signal to be transmitted, in well-known fashion. Control box 703 receives the amplified signal and is responsible for apportioning the amplified signal between antennas 705-1 through 705-n. Antennas 705-1 through 705-n each radiate the output signal, in well-known fashion, and the distance between the most distant two antennas is advantageously, for the reasons stated above, at least $\lambda$ where λ is the wavelength of a carrier of interest in the signal to be amplified.

Figure 8:
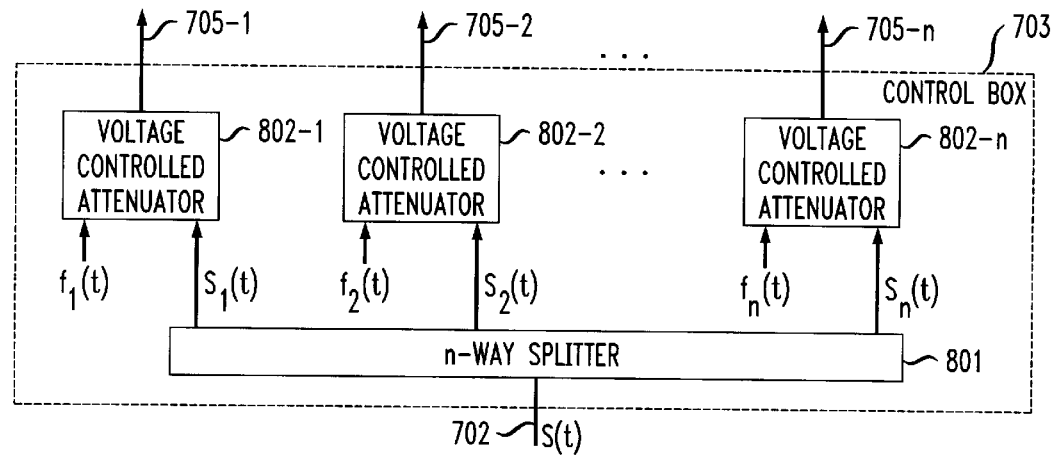
FIG. 8 depicts a block diagram of the control box in FIG. 7.

FIG. 8 depicts a block diagram of the components of control box 703 in accordance with the illustrative embodiment. Control box 703 advantageously comprises: a signal replicator, such as n-way Splitter 801, and n signal modifiers, such as voltage controlled attenuators 802-1 through 802-n. Splitter 801 is advantageously a signal replicator that splits the incoming signal, S(t), into n signals, $S_1(t)$ through $S_n(t)$, such that each signal is substantially an analog representation of the incoming signal, in well-known fashion. It will be clear to those skilled in the art that splitter 801 can be implemented using, for example, one or more Wilkinson couplers, 3 dB Hybrid couplers, or other passive devices. Alternatively, splitter 801 can be implemented using active circuitry, in well-known fashion.

Voltage controlled attenuators 802-1 through 802-n are advantageously matched and each advantageously modifies or amplifies the input signal in proportion to a corresponding control signal $f_1(t)$ through $f_n(t)$. The control signals $f_1(t)$ through $f_n(t)$ can be created in a microprocessor or other computational device (not shown) in control box 703. Voltage controlled attenuator 802-i advantageously accepts the input signal, $S_i(t)$, controlled by the control signal $f_i(t)$ and outputs the signal $f_i(t) S_i(t)$.

Advantageously, $0 \leq f_i(t) \leq 1$, for all i and all t, $$\sum_{i=1}^{n} f_i(t) = 1,$$

for all i and all t, $$\sum_{i=1}^{n} f_i(t) S_i(t) = k,$$

for all i and all t, where k is a constant, and $f_i(t)$, for all i, is independent of the wavelength λ of a carrier of interest in the input signal or the distance between any two of antennas 705-1 through 705-n. Advantageously, the sum of the radiated power from all of the antennas is a constant over time, and is also the same as the total radiated power as would be used by a wireless base station without an embodiment of the present invention. In other words, the illustrative embodiment of the present invention does not require, and advantageously avoids, any change in the total radiated power of the transmitted signal.

Advantageously, $f_i(t)$ is a periodic function. For n=2, Table 1 depicts some possible functions for $f_i(t)$:

TABLE 1

|   | $f_1(t)$ | $f_2(t)$ | $f_1(t) + f_2(t)$ |
|---|---|---|---|
| 1 | $\sin^2 t$ | $\cos^2 t$ | 1 |
| 2 | squarewave | squarewave + 180° | 1 |
| 3 | sawtooth | sawtooth + 180° | 1 |

It will be clear to those skilled in the art how to determine functions for $f_i(t)$ for $n \geq 2$.

Advantageously, the frequency of $f_i(t)$ is between 25 Hz and 250 Hz and, illustratively, is about 100 HZ so as to create a virtual speed by the wireless terminal of from 17 to 33 MPH. Antennas 705-1 through 705-n radiate the signals $f_i(t) S_i(t)$, in well-known fashion. It will be clear to those skilled in the art how to make and use control box 703 and transmitter 700.

Figure 9:
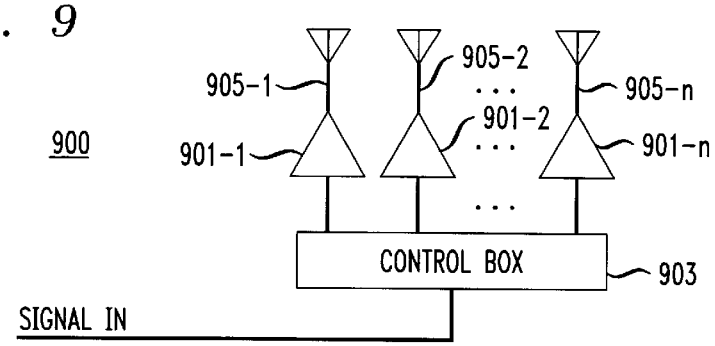
FIG. 9 depicts a block diagram of another illustrative embodiment of the present invention.

FIG. 9 depicts a block diagram of an alternative embodiment of the present invention that enables control box 903 to operate on lower power signals and also avoids the inevitable power attenuation caused having the control box operate on amplified signals. Transmitter 900 advantageously comprises: control box 903, antennas 905-1 through 905-n, and amplifiers 901-1 through 901-n, interconnected as shown.

The signal to be transmitted is input into control box 903, which is identical to control box 703 in FIG. 7, except that it need not operate on such high-power signals. Antennas 905-1 through 905-n are identical to antennas 705-1 through 705-n and the distance between the most distant of antennas 905-1 through 905-n is advantageously, for the reasons stated above, at least λ. Amplifiers 901-1 through 901-n are advantageously matched and replace amplifier 701 in FIG. 7. It will be clear to those skilled in the art how to make and use transmitter 900.

Figure 10:
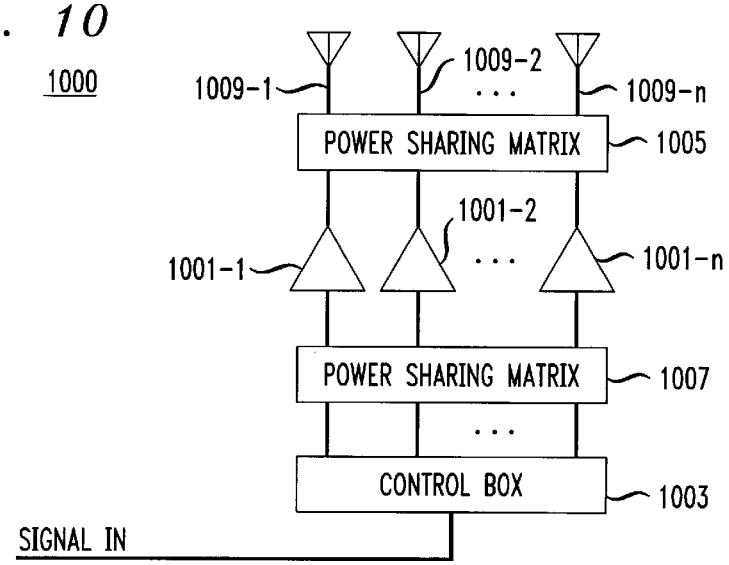
FIG. 10 depicts a block diagram of a third illustrative embodiment of the present invention.

FIG. 10 depicts a block diagram of a third alternative embodiment of the present invention, transmitter 1000, that comprises: control box 1003, amplifiers 1001-1 through 1001-n sandwiched between power sharing matrix 1005 and power sharing matrix 1007, and antennas 1009-1 through 1009-n, interconnected as shown. The signal to be transmitted is input into control box 1003, which is identical to control box 703 in FIG. 8. Antennas 1009-1 through 1009-n are identical to antennas 705-1 through 705-n and the distance between the most distant of antennas 1009-1 through 1009-n is advantageously, for the reasons stated above, at least λ.

Power sharing matrix 1005 and power sharing matrix 1007 are each advantageously n×n hybrid or Butler matrices, and power sharing matrix 1005, power sharing matrix 1007 and amplifiers 1001-1 through 1001-n advantageously comprise a "sandwich" or "compound" amplifier, as is well-known in the prior art. The use of the sandwich amplifier in transmitter 1000 instead of amplifiers 901-1 through 901-n as in the embodiment of FIG. 9 generally allows amplifiers 1001-1 through 1001-n to be smaller and less expensive than amplifiers 901-1 through 901-n. It will be clear to those skilled in the art how to make and user transmitter 1000.

Advantageously, embodiments of the present invention comprise at least three antennas that are not arranged in a line. For example, three antennas that are located at the vertices of an equilateral triangle. When at least three antennas are not arranged in a line, the likelihood is increased that a wireless terminal will perceive the virtual motion of the base station's antenna regardless of the position and velocity of the wireless terminal with respect to the base station's antenna.

It is to be understood that the above-described embodiments are merely illustrative of the invention and that many variations may be devised by those skilled in the art without departing from the scope of the invention. It is therefore intended that such variations be included within the scope of the following claims.

What is claimed is:

1. A method for processing an input signal, S(t), said method comprising:

creating n signals, $S_i(t)$ for all n, that are analog representations of said input signal;

modifying each of said n signals by one of n factors, $f_i(t)$, to create n modified signals, $f_i(t) S_i(t)$; and radiating each of said n modified signals, $f_i(t) S_i(t)$, from a different one of a plurality of antennas;

wherein $$\sum_{i=1}^{n} f_i(t) S_i(t) = k,$$

for all t, wherein k is a constant.

2. The method of claim 1 wherein said plurality of antennas is n antennas.

3. The method of claim 1 wherein said input signal comprises a carrier with a wavelength of $\lambda$ and the distance between each of said plurality of antennas is at least $\lambda$.

4. The method of claim 3 wherein each of n factors, $f_i(t)$, is independent of $\lambda$.

5. The method of claim 1 wherein n=2, $f_1(t)=\sin^2 t$ and $f_2(t)=\cos^2 t$.

6. The method of claim 5 wherein $f_1(t)$ and $f_2(t)$ each have a frequency of between 25 Hz and 250 Hz.

7. The method of claim 1 wherein n=2, $f_1(t)$ is a squarewave and $f_2(t)$ is said squarewave+180°.

8. The method of claim 1 wherein n=2, $f_1(t)$ is a sawtooth and $f_2(t)$ is said sawtooth+180°.

9. The method of claim 8 wherein $f_1(t)$ and $f_2(t)$ each have a frequency of between 25 Hz and 250 Hz.

10. An apparatus for processing an input signal, S(t), said apparatus comprising:
  a signal replicator for creating n signals, $S_i(t)$ for all n, that are analog representations of said input signal;
  a signal modifier for modifying each of said n signals by one of n factors, $f_i(t)$, to create n modified signals, $f_i(t)S_i(t)$; and
  a plurality of antennas for radiating each of a different one of said n modified signals, $f_i(t)S_i(t)$;

wherein $$\sum_{i=1}^{n} f_i(t) S_i(t) = k,$$

for all t, wherein k is a constant.

11. The apparatus of claim 10 wherein said plurality of antennas is n antennas.

12. The apparatus of claim 10 wherein said input signal comprises a carrier with a wavelength of $\lambda$ and the distance between each of said plurality of antennas is at least $\lambda$.

13. The apparatus of claim 12 wherein each of n factors, $f_i(t)$, is independent of $\lambda$.

14. The apparatus of claim 10 wherein n=2, $f_1(t)=\sin^2 t$ and $f_2(t)=\cos^2 t$.

15. The apparatus of claim 14 wherein $f_1(t)$ and $f_2(t)$ each have a frequency of between 25 Hz and 250 Hz.

16. The apparatus of claim 10 wherein n=2, $f_1(t)$ is a squarewave and $f_2(t)$ is said squarewave+180°.

17. The apparatus of claim 10 wherein n=2, $f_1(t)$ is a sawtooth and $f_2(t)$ is said sawtooth+180°.

18. The apparatus of claim 17 wherein $f_1(t)$ and $f_2(t)$ each have a frequency of between 25 Hz and 250 Hz.

* * * * *